April 24, 1928.  E. C. GAYER  1,667,290

VARIABLE POWER TRANSMISSION MECHANISM

Filed Dec. 23, 1924  5 Sheets-Sheet 2

Inventor
Ernest C. Gayer
By George A. Prevost
atty.

April 24, 1928.

E. C. GAYER 1,667,290

VARIABLE POWER TRANSMISSION MECHANISM

Filed Dec. 23, 1924 5 Sheets-Sheet 3

Inventor:
Ernest C. Gayer
By George A. Purvort
Atty

Inventor.
Ernest C. Gayer
By George A. Prevost
Atty.

April 24, 1928.
E. C. GAYER
1,667,290
VARIABLE POWER TRANSMISSION MECHANISM
Filed Dec. 23, 1924 5 Sheets-Sheet 5
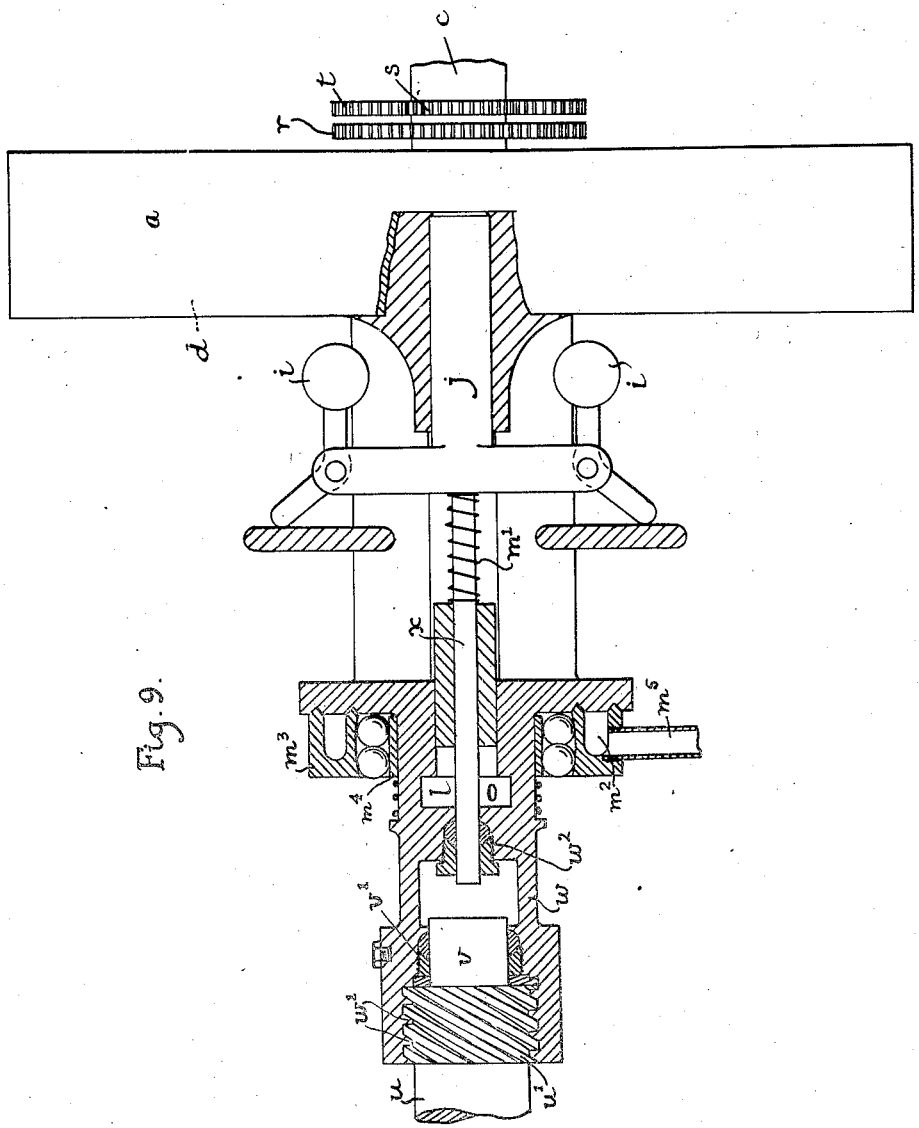

Patented Apr. 24, 1928.

1,667,290

UNITED STATES PATENT OFFICE.

ERNEST CONWAY GAYER, OF LONDON, ENGLAND.

VARIABLE POWER-TRANSMISSION MECHANISM.

Application filed December 23, 1924, Serial No. 757,637, and in Great Britain December 28, 1923.

This invention relates to variable power transmission mechanism.

According to the invention the driving shaft or power unit actuates the driven shaft through the transmission gear in such a manner that fluctuations in the torque of the driven shaft react through the said gear on a governor; or a plunger actuated by the torque of the driving shaft or a combination of the said governor and plunger or a manually or other non-automatically operating control.

To enable the invention to be fully understood I will describe it by reference to the accompanying drawing, in which:—

Figure 9 is a longitudinal sectional elevation illustrating a modification.

Referring to Figures 1 to 6, $a$ is the driving or power unit of the mechanism which is attached by the coupling member $a^1$ to the shaft of a suitable motor, not shown, and is rotatable by the latter around the axis A, the said unit being journaled at both ends in bearings $a^2$, $a^3$ the bearings $a^2$ being formed at one end of a frame $b$, whilst the other bearing $a^3$ is formed in the end of the driven unit or shaft $c$. The shaft $c$ is co-axial with the axis A, and has its end journalled in a bearing $a^4$ in the frame $b$. $d$ is a rotatable unit intermediate of, and co-axial with, the driving and driven units and mounted to rotate freely on the said driving unit and which is geared to both of the said units by epicyclic gearing, hereinafter described. The unit $d$ is capable of being clutched to the driving unit by pressure exerted by hydraulic or fluid pumps, also hereinafter described, when the torque of the driven unit is equal to the torque of the said driving unit but becomes declutched when the torque of the driven unit exceeds that of the driving unit so that the said driven unit is rotated by the gearing at a speed dependent on the torque thereof.

The frame $b$ is in the form of a box casing which also forms a sump for the oil or other fluid to be pumped for the purpose above described.

$e$, $f$ and $e^1$, $f^1$ are two pairs of pump cylinders formed radially of the axis of the unit $d$ and $g$, $h$ are ports arranged in the unit $a$ so that they communicate with each opposite pair of cylinders $e$, $f$ and $e^1$, $f^1$ alternately, and in turn, every half revolution, when any rotary movement occurs between the said units $a$ and $d$.

Mounted on the unit $a$ is a centrifugal governor $i$ controlling a sliding plunger valve $j$, arranged co-axially with the unit $a$ and covering a port $k$ in the latter, the said governor holding the valve $j$ down on its seat $j^1$ by centrifugal action, the action of the governor being assisted by two tension springs $i^1$, $i^1$.

Figure 1:
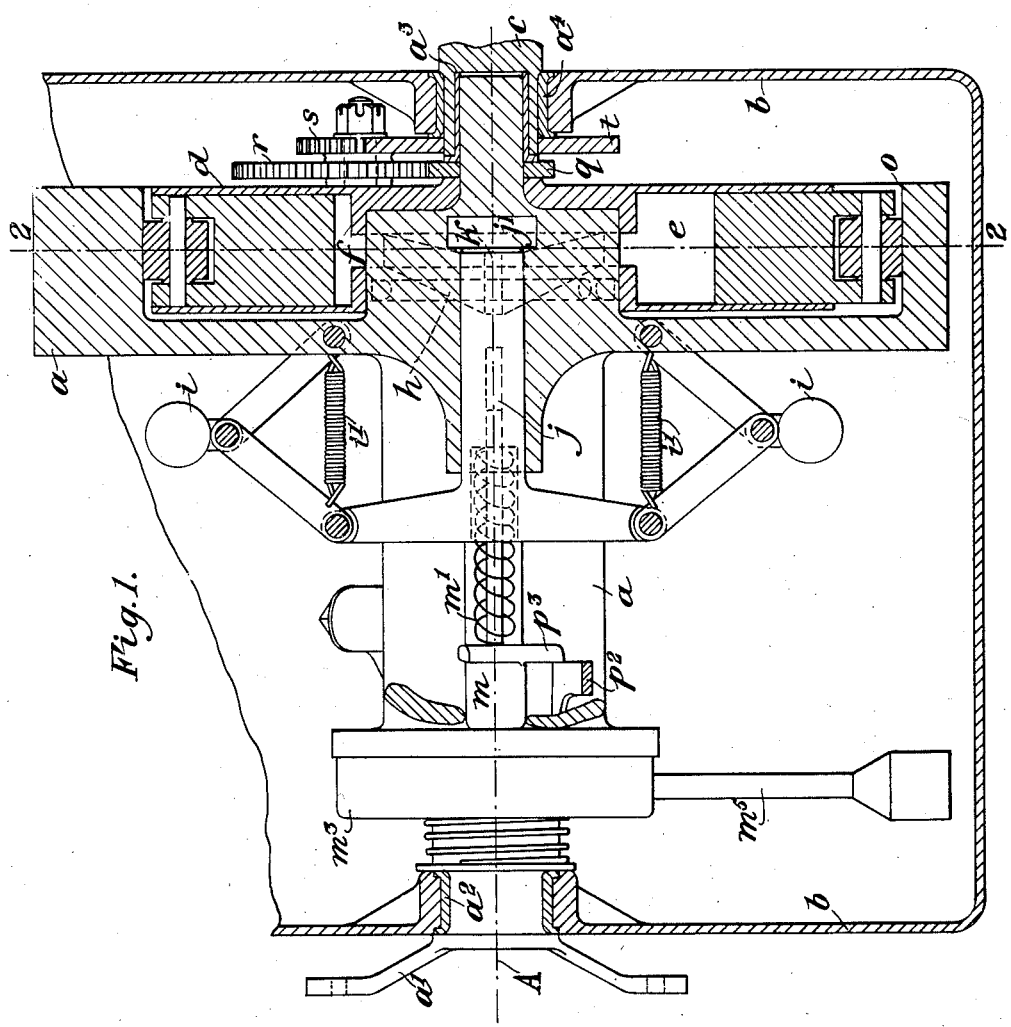
Figure 1 is a longitudinal sectional elevation of one form of variable power transmission mechanism constructed in accordance with the invention.
Figure 2:
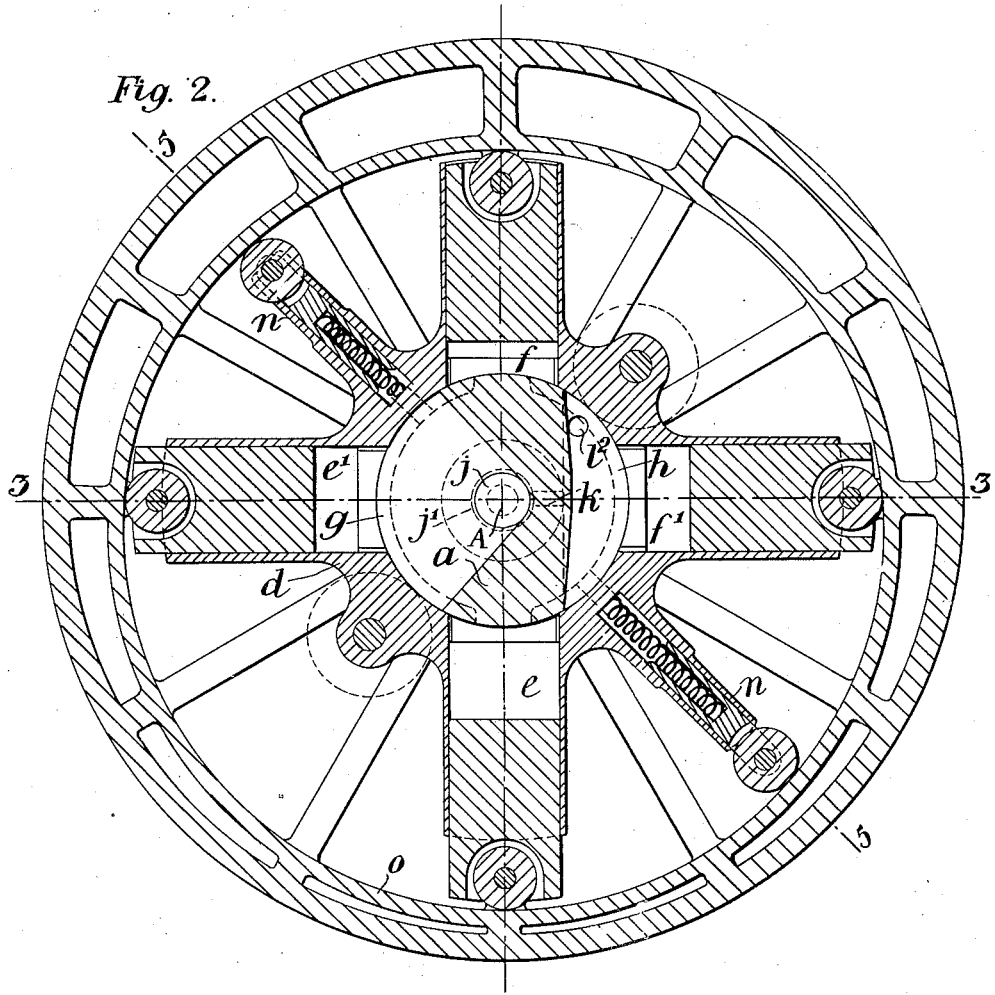
Figure 2 is a section on the line 2—2, Figure 1.
Figure 3:
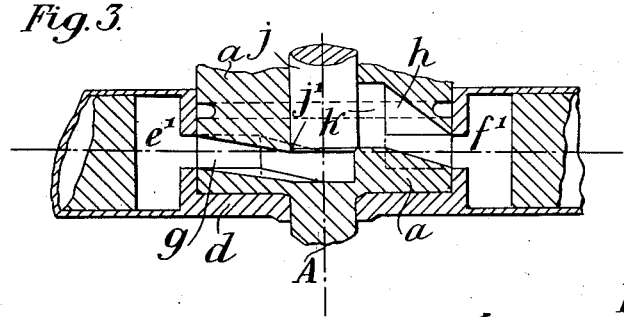
Figure 3 is a section on the line 3—3, Figure 2.
Figure 4:
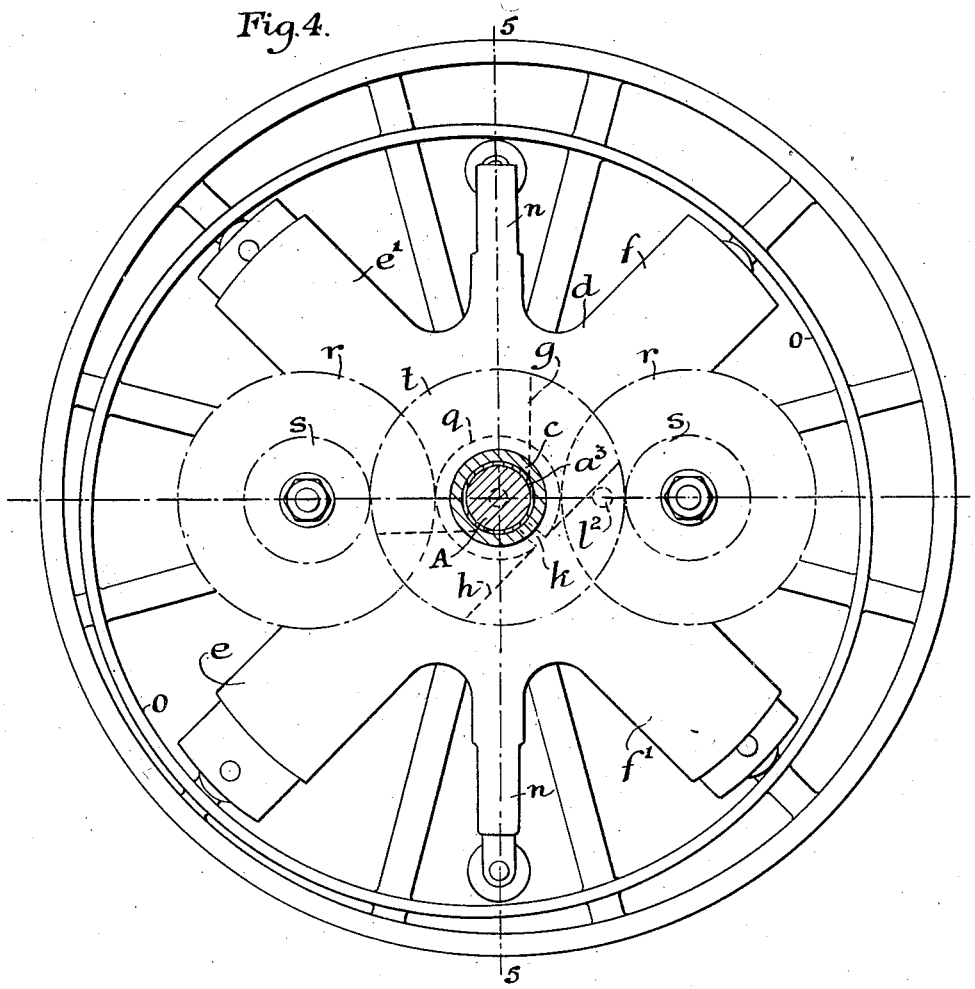
Figure 4 is an end view of the mechanism.
Figure 6:
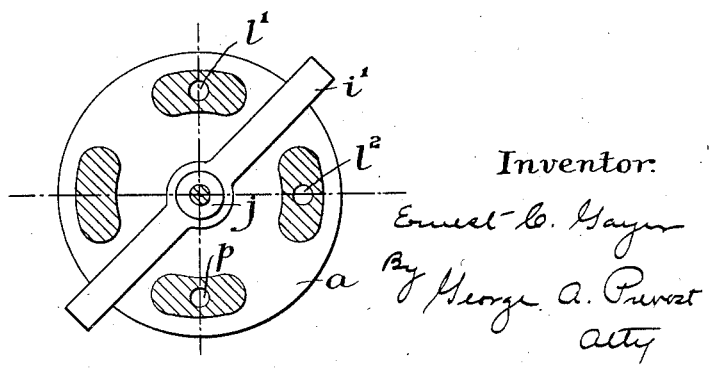
Figure 6 is a section on the line 6—6, Figure 5.
Figure 5:
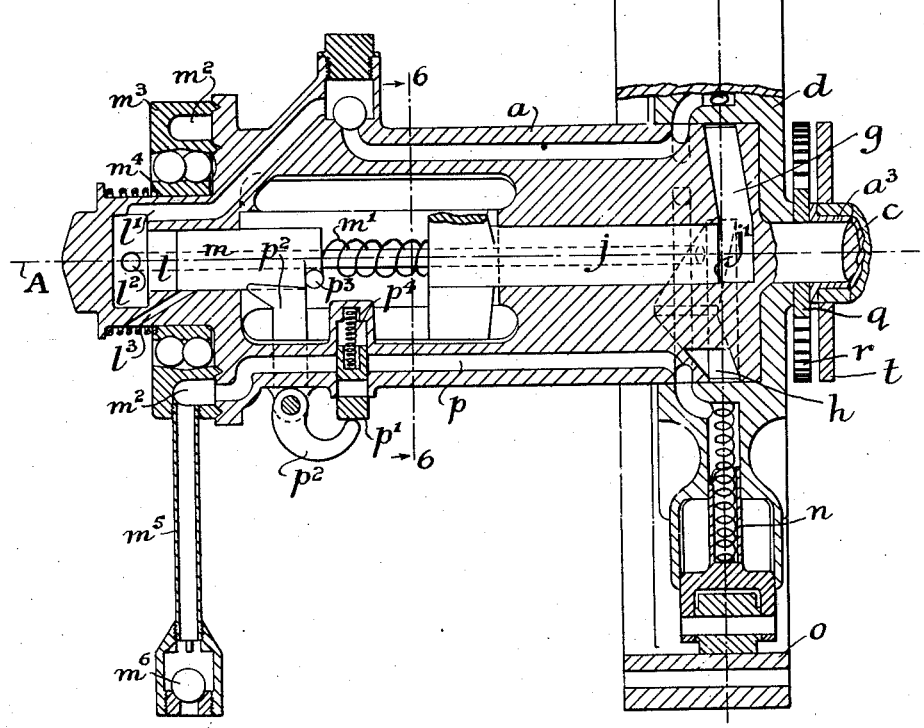
Figure 5 is a longitudinal sectional elevation of a part of the mechanism, the section being taken on the line 5—5, Figures 2 and 4.
Figure 7:
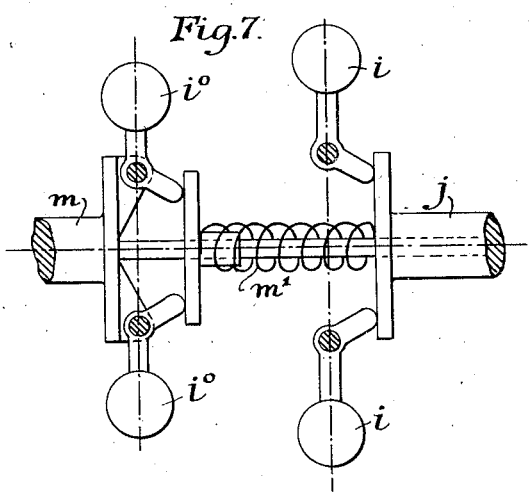
Figures 7 and 8 are views illustrating modifications of the centrifugal governor and co-acting parts.

This governor can be used alone where the power unit $a$ is normally worked at its maximum; or be replaced by a spring to hold the valve $j$ on its seat, but in the case of a power unit such as a motor-car engine having a variable speed and torque, another governor may be necessary, as shown in Figure 7, and hereinafter explained.

Figure 8:
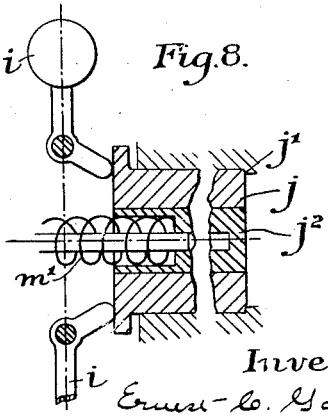

In another arrangement, the valve $j$ is divided into two parts as shown in Figure 8, viz, an outer ring or valve proper used to control the port $k$ and controlled by the governor $i$ and an inner plunger $j^2$ used to equalize the fluid pressure in the system, this is also hereinafter referred to.

$l$ is a compression chamber or cylinder formed in, and co-axial with, the valve $j$ and slidable in this cylinder is a plunger $m$. The cylinder $l$ has three port openings, viz, an opening $l^1$ which serves as the outlet for either of two small force pumps $n$, $n$ on unit $d$, and the plungers of which are operated by contact with the cam surface $o$ on the unit $a$, an opening $l^2$ which connects the cylinder $l$ directly with the port $h$ and an opening $l^3$ which forms an exhaust port when the plunger $m$ is moved sufficiently far to open it.

When the plunger $m$ is moved towards the end of the cylinder $l$ by a spring $m^1$ it automatically frees the suction passage $p$ from the sump formed by the casing $b$. The said passage serves for either pump $n$ as it is in connection with an annular groove or passage $m^2$ in one face of a ring $m^3$ mounted freely on a bearing $m^4$ on the unit $a$, the said ring being co-axial with the unit and bearing against an end face thereof, through which face the passage $p$ is formed. The groove $m^2$ opens into a pendant pipe $m^5$ which forms an extension of the passage $p$ and contains a non-return valve $m^6$. The passage $p$ is normally blocked by a slide valve $p^1$, Figure 5, which, when moved by a lever $p^2$ bearing against a cross-head $p^3$ on the end of the plunger $m$, when the latter is moved into the cylinder $l$, forms a through passage for the oil, or other fluid to either pump. Assuming that there is a rotary movement between units $a$ and $d$ to work the pumps $n$, the fluid pumped thereby will be delivered through the port $l^1$ into the cylinder $l$ until the pressure of oil increases sufficiently to drive the plunger $m$ outwardly, thus allowing the valve $p^1$ to move under the influence of the spring $p^4$ and cut off the fluid supply. When this occurs the fluid pressure in the cylinder $l$ will be equal, or nearly so, to the fluid pressure in the pump cylinders $e$, $e^1$ exerted against the valve $j$, or, in other words, the fluid pressure in the cylinders $f$, $f^1$ would equal or nearly equal that in the cylinders $e$, $e^1$. If, however, a valve as shown in Figure 8, is used, this would ensure the pressure of oil being equal throughout the system.

Mounted on, and co-axial with, the unit $a$ is a sun-wheel $q$ of the epicyclic gear with which mesh planet wheels $r$, $r$, the latter being co-axial with and connected to two other planet wheels $s$, $s$ which mesh with another sun-wheel $t$ mounted on, and co-axial with, the driven unit $c$. From the foregoing it will be seen that the driving connection between the units $a$ and $d$ is through the planet wheels $r$, $r$ and the sun-wheel $q$ and also between the cam $o$ and the pistons working in the cylinders $e$, $e^1$ and $f$, $f^1$.

In the operation of the mechanism assume that the driving engine runs at a constant speed, and exerts a constant torque, and that the unit $d$ is prevented from rotating on the unit $a$ by the oil or other fluid compressed in the cylinders $e$, $e^1$, this being the case so long as the pressure of oil is not sufficient to lift the valve $j$ off its seat, and allow it to escape through the port $k$. The compression of this oil in the cylinders $e$, $e^1$ is due to the load on the driven unit $c$ tending to rotate the unit $d$ in a contrary direction to that of the unit $a$, and is only prevented from so doing, through the oil being incompressible, and having no means of escape. It is, therefore, obvious, that the power exerted to hold the valve $j$ on its seat, may equal, but must not exceed, the pressure set up by the oil in the cylinders $e$, $e^1$ to lift the valve $j$ when the torque required to drive the unit $c$ is just equal to the torque given out by the power unit $a$. As soon as the torque required to drive the unit $c$ exceeds the torque of the engine or motor, the pressure of oil in the cylinders $e$, $e^1$ should be sufficient to lift the valve $j$ and allow oil to escape through the port $k$ to the cylinders $f$, $f^1$. When this occurs a rotary movement is set up between the units $a$ and $d$ and the force pumps $n$, $n$ are thus set working, and owing to the plunger $m$ being forced into the cylinder $l$ by the spring $m^1$ through the outward movement of the valve $j$, the pumps $n$ deliver oil into the said cylinder until the pressure of oil in the system is increased sufficiently to force the plunger $m$ out again, by compressing the spring $m^1$ far enough to cut off the delivery of oil to the pumps. When this point is reached, the oil pressure in the whole system is increased and equal, tending to open the valve $j$ against the pressure of the governor $i$ and compress the spring $m^1$ as the flow of the oil is from the cylinders $e$, $e^1$ to the cylinders $f$, $f^1$ owing to the oil being forced from the said cylinders $e$, $e^1$, and as the oil pressure in these latter cylinders increases, as the load on the driven unit $c$ increases, the spring $m^1$ is still more compressed and the port $k$ opened wider, allowing more oil to pass, and a quicker movement between the units $a$ and $d$, or a bigger gear ratio, to meet the heavier torque of the driven unit $c$.

Conversely, when the load on the driven unit $c$ is being reduced, the pressure of oil in the cylinders $e$, $e^1$ will be reduced, and the governor tend to close the valve $j$, and the plunger $m$ will tend to be forced out of the cylinder $l$ to follow up the movement of the valve $j$ until the opening of the port $k$ is just sufficient to allow the necessary flow of oil, to admit of the correct ratio of gearing to take the load on the driven unit $c$. This movement of the plunger $m$ will uncover the exhaust port $l^3$ so that a certain amount of oil will escape, allowing the spring $m^1$ to expand again, thus pushing the plunger $m$ back into the cylinder $j$ to replace the oil lost, and reducing the oil pressure of the whole system. It must be remembered that the governor $i$ is always exerting pressure on the valve $j$ against the pressure of oil in the cylinders $e$, $e^1$ and trying to close the said valve and would be the first agent to effect such closure, but the spring $m^1$ could not expand until some of the oil had been expelled.

Direct drive is maintained as long as the valve $j$ is not lifted off its seat, as the pressure of oil set up in the cylinders $e$, $e^1$ prevents any relative movement between the units *a* and *d*, and thus locks the train of gear-wheels in the epicyclic gear, the mechanism merely acting as a direct coupling between the said units. As soon, however, as the load on the driven unit is sufficient to lift the valve *j* the whole mechanism is thrown out of balance, so to speak.

The improved mechanism has been described, in connection with a power unit having a constant speed and torque and should a power unit be used with variable torque and speed, it is necessary to vary the strength of the spring $m^1$, and this may be effected, for example, by mounting an additional centrifugal governor $i^o$ on the plunger *m*, see Figure 7, so arranged that it presses against the spring $m^1$ and tends to shorten it, and thus increases its strength as the speed of the engine and consequently the centrifugal action of the governor increases.

Figure 9 illustrates the arrangement where the torque of the driving shaft actuates a sliding plunger *q* either alone or in combination with the governor or a spring hereinbefore described. In this figure the driving or motor shaft *u* is coupled to the driving gear through the medium of a screw thread $u^1$ formed on the said driving-shaft, an extension of which constitutes the plunger *v*. This plunger passes through a stuffing box $v^1$ into a hydraulic cylinder *w* formed at the end of the said driving shaft gear and having an extension provided with a female screw-thread $w^1$ engaging the male thread $u^1$. *x* is an extension of the valve *j* hereinbefore described which passes into the hydraulic cylinder *w* through a stuffing box $w^2$ at the end opposite to that containing the plunger *v*. The hydraulic cylinder is filled with fluid, for instance, mercury.

In the operation of the described mechanism any torque exerted by the driving shaft will produce a pressure on the fluid in the cylinder *w* by movement of the plunger *v* due to the rotation of the screw $u^1$ this pressure reacting by means of the valve *j* on the pressure exerted by the pumps *e*, *f* and $e^1$, $f^1$ hereinbefore referred to.

In this arrangement it will be necessary to divide the functions of valve *j* as described with reference to Figure 8 but with the difference that the inner plunger $j^2$ shown in the said figure will be entirely separated from the valve *j* by preference situated on the opposite side of the ports *g*, *h*, the valve *j* itself being modified in design to make it suitable for the function it has to perform.

Claims.

1. In a variable power transmission mechanism, including a driving shaft, a rotary driving unit connected thereto, a rotary driven unit, and a rotary unit intermediate of and co-axial with the said driving and driven units; a torque responsive device connecting said driving shaft and driving unit, comprising a rotatable casing inwardly threaded at one end to receive corresponding threads formed on said driving shaft, a hydraulic cylinder in said casing filled with a suitable fluid, a plunger also formed on the end of said driving shaft, passing through a stuffing box into said cylinder, a second substantially smaller plunger extending from the opposite direction through an oppositely disposed stuffing box, into the other side of said cylinder, its outer end forming a connecting rod leading to a valve arrangement in said driving unit.

2. Variable power transmission mechanism comprising a rotary driving unit, a rotary driven unit, a rotary unit intermediate of and co-axial with the said driving and driven units, an elastic pressure device carried thereby, epicyclic gearing by which the said intermediate unit is geared to said driving and driven units, hydraulic pumps carried by the intermediate unit, a valve arranged in operative relation with the elastic pressure device for controlling the supply of the fluid to the hydraulic pump, said driving unit being formed in two parts, comprising a hydraulic plunger and a hydraulic cylinder therefor, both axially rotatable, said cylinder and plunger being provided respectively with co-acting male and female screw-threads and a second hydraulic plunger also located in the hydraulic cylinder and connected to the valve in operative relation with the elastic pressure device, so that pressure exerted upon the fluid in said cylinder by the first mentioned hydraulic plunger, when under torque re-acts through the medium of the second plunger and said valve against the pressure exerted by the hydraulic pumps, said pumps, when the torques of the driving and driven units are equal, cause the intermediate unit to clutch the driving unit so that the former is driven at the same speed as the latter, whilst, when the torque of the driven unit exceeds that of the driving unit, the said units are de-clutched and the driven unit rotated by the gearing at a speed dependent on the torque thereof.

ERNEST CONWAY GAYER.